(12) United States Patent
Chang

(10) Patent No.: US 8,302,563 B2
(45) Date of Patent: Nov. 6, 2012

(54) SOW FEEDER

(75) Inventor: Jung Wei Chang, Taichung (TW)

(73) Assignee: Emperor Penguin Enterprise Co., Ltd., Taichung (TW)

( * ) Notice: Subject to any disclaimer, the term of this patent is extended or adjusted under 35 U.S.C. 154(b) by 343 days.

(21) Appl. No.: 12/753,112

(22) Filed: Apr. 2, 2010

(65) Prior Publication Data

US 2011/0239947 A1    Oct. 6, 2011

(51) Int. Cl.
*A01K 5/00* (2006.01)

(52) U.S. Cl. .................... 119/53.5; 119/57.91

(58) Field of Classification Search .......... 119/51.04, 119/52.1, 52.4, 53, 53.5, 54, 57, 57.5, 57.6, 119/57.91; 222/181.1, 185.1, 460

See application file for complete search history.

(56) References Cited

U.S. PATENT DOCUMENTS

| 3,730,142 A | * | 5/1973 | Kahrs et al. | 119/54 |
| 5,333,572 A | * | 8/1994 | Nutt | 119/57.91 |

* cited by examiner

*Primary Examiner* — Rob Swiatek
*Assistant Examiner* — Ebony Evans

(57) ABSTRACT

A sow feeder includes a feed storage hopper comprising an upper funnel, an intermediate feed discharging tube, and a ring fixedly secured under the feed discharging tube; a feed transport mechanism comprising a cylindrical solid post having a diameter less than inner diameters of both the ring and the feed discharging tube, and a base having a diameter greater than an outer diameter of the ring; a hollow fastening mechanism releasably secured to the post passing through the ring and the feed discharging tube; and a feed collection container releasably secured to the feed discharging tube to dispose below the base. Feed material in the feed storage hopper is adapted to discharge into the feed collection through the feed discharging tube by lifting the base.

1 Claim, 2 Drawing Sheets

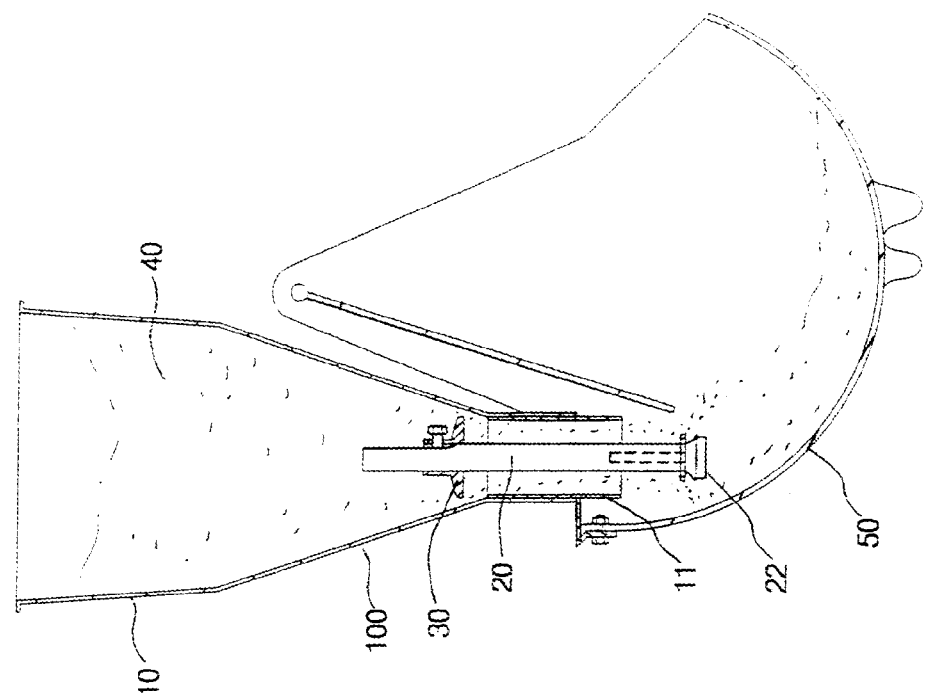
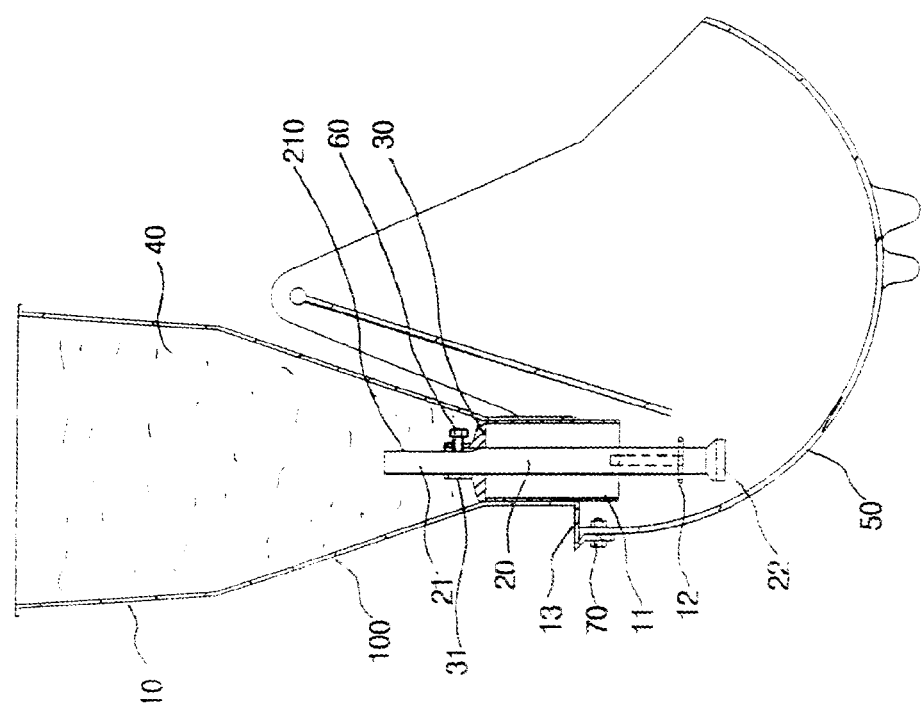

SOW FEEDER

BACKGROUND OF THE INVENTION

1. Field of Invention

The invention relates to animal feeding devices and more particularly to a sow feeder with improved characteristics.

2. Description of Related Art

Typically, a sow is confined in a stall (e.g., sow stall) in piglet breeding period. It is typical for a farm employee to regularly pour feed material into a feed collecting trough of a feeder located at gate of the stall so that a sow may eat the feed material. However, it is time consuming and labor-intensive job.

A great number of prior patents for animal feeder are disclosed. For example, U.S. Pat. No. 4,825,811 discloses a sow feeder.

Thus, continuing improvements in the exploitation of animal feeder are constantly being sought.

SUMMARY OF THE INVENTION

It is therefore one object of the invention to provide a sow feeder comprising a feed storage hopper comprising an upper funnel, an intermediate feed discharging tube, and a ring fixedly secured under the feed discharging tube; a feed transport mechanism comprising a cylindrical solid post having a diameter less than inner diameters of both the ring and the feed discharging tube, and a base having a diameter greater than an outer diameter of the ring; a hollow fastening mechanism releasably secured to the post passing through the ring and the feed discharging tube; and a feed collection container releasably secured to the feed discharging tube to dispose below the base. Feed material in the feed storage hopper is adapted to discharge into the feed collection through the feed discharging tube by lifting the base.

The above and other objects, features and advantages of the invention will become apparent from the following detailed description taken with the accompanying drawings.

BRIEF DESCRIPTION OF THE DRAWINGS

FIG. 2 is a longitudinal sectional view of the complete sow feeder in a feed material stop state; and FIG. 3 is a view similar to FIG. 2 showing a feed material feeding state.

DETAILED DESCRIPTION OF THE INVENTION

Figure 1:
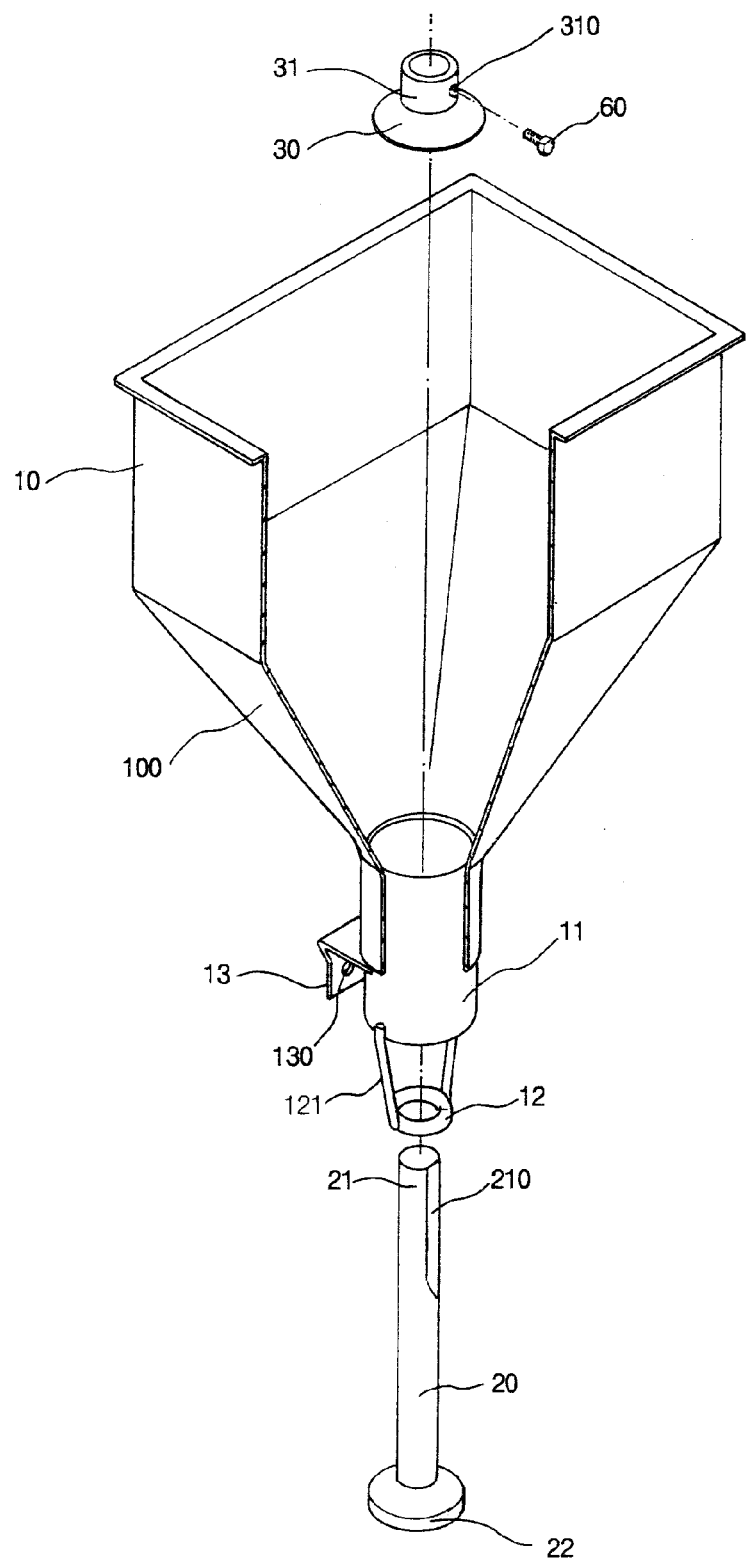
FIG. 1 is an exploded view in part section of a main portion of a sow feeder according to the invention.

Referring to FIGS. 1 to 3, a sow feeder in accordance with the invention comprises the following components as discussed in detail below.

A feed storage hopper 10 comprises a funnel-shaped intermediate portion 100, a feed discharging tube 11 secured to a lower portion, an about 90 degree bent mounting plate 13 integrally formed with the lower portion, the mounting plate 13 having a threaded hole 130 on a vertical portion, and a ring 12 fixedly secured under the tube 11 by means of two opposite support bars 121. A feed transport mechanism 20 comprises a cylindrical solid post 21 having a diameter less than inner diameters of both the ring 12 and the tube 11, the post 21 having an upper cut flat 210, and an enlarged circular base 22 having a diameter greater than an outer diameter of the ring 12.

A circular, hollow fastening mechanism 30 comprises a central through hole (not numbered) and a hollow cylinder 31 in communication with the through hole, the cylinder 31 having a lateral threaded hole 310. After inserting the post 21 through the ring 12, the tube 11, and the cylinder 31, a threaded fastener 60 can be used to drive through the threaded hole 310 to secure the transport mechanism 20 and the fastening mechanism 30 together. A feed collection container 50 is secured to the mounting plate 13 by driving a threaded fastener 70 through the threaded hole 130 and the feed collection container 50.

The base 22 is prevented from inserting into the ring 12 (i.e., being stopped there) because, as stated above, the base 22 has a diameter greater than the outer diameter of the ring 12. Feed material 40 stored in the hopper 10 may discharge into the feed collection container 50 via a path from an annular gap between the fastened fastening mechanism 30 and the funnel-shaped intermediate portion 100 and the tube 11 to a discharge opening between the base 22 and the bottom of the tube 11 when a sow pushes the base 22 upward by the snout. Moreover, the amount of feed material 40 being discharged can be precisely controlled by adjusting a fastening position of the fastening mechanism 30 at the post.

While the invention herein disclosed has been described by means of specific embodiments, numerous modifications and variations could be made thereto by those skilled in the art without departing from the scope and spirit of the invention set forth in the claims.

What is claimed is:

1. A sow feeding device comprising:

a feed storage hopper comprising an upper funnel, an intermediate feed discharging tube, and a ring fixedly secured under the feed discharging tube;

two opposite support bars each having one end secured to the feed discharging tube and the other end secured to the ring;

a feed transport mechanism comprising a cylindrical solid post having a diameter less than inner diameters of both the ring and the feed discharging tube, and a base having a diameter greater than an outer diameter of the ring;

a hollow fastening mechanism releasably secured to the post, said post passing through the ring and the feed discharging tube; and a feed collection container releasably secured to the feed discharging tube and disposed below the base, wherein feed material in the feed storage hopper is adapted to discharge into the feed collection through the feed discharging tube by lifting the base.

* * * * *